United States Patent
Stephenne et al.

(10) Patent No.: US 11,303,337 B2
(45) Date of Patent: Apr. 12, 2022

(54) RADIATION PATTERN MODIFICATION IN THE PRESENCE OF INTERFERENCE SOURCES IN FREQUENCY DIVISION DUPLEX (FDD) SYSTEMS

(71) Applicant: Telefonaktiebolaget LM Ericsson (publ), Stockholm (SE)

(72) Inventors: Alex Stephenne, Stittsville (CA); Pierre-Andre Laporte, Gatineau (CA); Mark William Wyville, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/970,993

(22) PCT Filed: May 16, 2018

(86) PCT No.: PCT/IB2018/053449
§ 371 (c)(1),
(2) Date: Aug. 19, 2020

(87) PCT Pub. No.: WO2019/220180
PCT Pub. Date: Nov. 21, 2019

(65) Prior Publication Data
US 2020/0382188 A1 Dec. 3, 2020

(51) Int. Cl.
*H04B 7/06* (2006.01)
*H04B 7/0426* (2017.01)
(Continued)

(52) U.S. Cl.
CPC ......... *H04B 7/0617* (2013.01); *H04B 7/0434* (2013.01); *H04L 5/14* (2013.01); *H04W 16/28* (2013.01)

(58) Field of Classification Search
CPC .. H04B 7/0434; H04B 7/0452; H04B 7/0617; H04L 5/14; H04W 16/28
See application file for complete search history.

(56) References Cited

U.S. PATENT DOCUMENTS 6,597,678 B1 * 7/2003 Kuwahara ............ H01Q 3/2605
370/335
8,144,057 B1   3/2012 Minkoff
(Continued)

FOREIGN PATENT DOCUMENTS

CN   101888644 A   11/2010
EP    2696513 A1    2/2014
(Continued)

OTHER PUBLICATIONS

PCT International Search Report and Written Opinion dated Feb. 12, 2019 for International Application PCT/IB2018/053449, 11 pages.
(Continued)

*Primary Examiner* — David S Huang
(74) *Attorney, Agent, or Firm* — Sage Patent Group

(57) ABSTRACT

A first radio node including processing circuitry configured to configure the first radio node to: obtain a first interference subspace, obtain beamforming weights based on the first interference subspace where the beamforming weights configured to modify a radiation pattern in at least one communication direction of at least one interference source, and perform wireless communications based on the beamforming weights.

19 Claims, 9 Drawing Sheets

(51) Int. Cl.
H04W 16/28 (2009.01)
H04L 5/14 (2006.01)

(56) References Cited

U.S. PATENT DOCUMENTS

| 2014/0378067 | A1* | 12/2014 | Au | H04B 17/0085 |
|---|---|---|---|---|
| | | | | 455/67.11 |
| 2017/0041057 | A1 | 2/2017 | Kim et al. | |
| 2017/0176507 | A1* | 6/2017 | O'Keeffe | H04B 1/0483 |
| 2017/0331667 | A1 | 11/2017 | Cai | |

FOREIGN PATENT DOCUMENTS

| WO | 2016126177 A1 | 8/2016 |
|---|---|---|
| WO | 2018033207 A1 | 2/2018 |

OTHER PUBLICATIONS

Hugl, K. et al., "Spatial Reciprocity of Uplink and Downlink Radio Channels in FDD Systems", European Cooperation in the Field of Scientific and Technical Research, COST 273 TD(02) 066, May 30-31, 2002, Espoo, Finland, 7 pages.
First Chinese Office Action for Chinese Patent Application No. CN 201880092145.5 dated Jan. 4, 2022, 10 pages (including English translation).

* cited by examiner $$R_{ss} = \begin{bmatrix} f_{0,0} & \cdots & f_{0,K-1} \\ \vdots & \ddots & \vdots \\ f_{I_s-1,0} & \cdots & f_{I_s-1,K-1} \end{bmatrix}$$

$max(abs(f_{0:I_s-1,0}))$ ... $max(abs(\ldots))$

FIG. 4

RADIATION PATTERN MODIFICATION IN THE PRESENCE OF INTERFERENCE SOURCES IN FREQUENCY DIVISION DUPLEX (FDD) SYSTEMS

CROSS-REFERENCE TO RELATED APPLICATIONS

This application is a 35 U.S.C. § 371 national stage application for International Application No. PCT/IB2018/053449, entitled "RADIATION PATTERN MODIFICATION IN THE PRESENCE OF INTERFERENCE SOURCES IN FREQUENCY DIVISION DUPLEX (FDD) SYSTEMS", filed on May 16, 2018, the disclosures and contents of which are hereby incorporated by reference in their entireties.

TECHNICAL FIELD

Wireless communication and in particular, to the modification of a radiation pattern in at least one communication direction of at least one interference source in Frequency Division Duplex (FDD) systems.

BACKGROUND

In advanced antenna systems (AAS), one or more downlink communication layers tuned to the same or different frequencies may experience one or more wireless channels between an antenna array of a radio node and one or more passive intermodulation (PIM) sources located in the vicinity of a cellular site. The one or more signals in the wireless channel may excite the PIM sources which in turn may generate intermodulation signals centered around one or more PIM frequencies.

For example, PIM may occur when one or multiple signals in one or multiple frequencies interact in a non-linear manner with a structure in a propagation environment such as the cellular site. This interaction may generate at least one interfering signal, at a possibly different frequency from the transmitted frequency(ies), which may radiate out of the PIM source. This process may be referred to as the "rusty bolt" effect due to junctions of different materials/metals such as the un-rusted bolt portion and the rusted bolt portion that may cause PIM. In other words, in some examples, the mechanical components of the wireless communication system itself, such as rusty bolts, may become PIM sources, although other structures in the propagation environment may also become PIM sources. These PIM sources may generate interfering signal(s) that may interfere with reception of an intended wireless signal at a receiver such as a radio node receiver.

Some existing PIM mitigation/cancellation techniques have been implemented in existing systems in the situation where some of the PIM signals overlap with some of the uplink (UL) channels and have a non-negligible power at the antenna array. One such technique involves sending a technician to the cellular site to replace structural components causing PIM, such as replacing rusty bolts with new bolts. One problem with sending a technician to the cellular site is that the cost combined with the results of the site visit may be too high as the PIM issue may not always be solved. Further, large antenna gain may under some circumstances be dictated by the beamforming weights, thereby exciting PIM sources that may not be removable from the environment such as a lamp post and/or a metallic handrail.

Another technique involves time-domain PIM cancellation. However, time-domain PIM cancellation techniques may not be a feasible option for AAS systems. For example, one problem with time-domain PIM cancellation techniques is that the large number of non-linear terms that may be generated for the time-domain PIM cancellation techniques may depend on one or more of the parameters listed below:

Downlink (DL) signal combinations based on one or more of DL antennas, polarity, frequency, delayed signal cross-terms, etc.
Number of UL antennas.
Number of UL channels.
Non-linear order of the PIM interference.
Number of intermodulation (IM) bands involved.

The number of non-linear terms that are generated increases exponentially for some of the parameter combinations. In addition, these non-linear terms may be generated at a larger sampling rate to avoid aliasing, which may result in a very large implementation cost that may prohibit the use of this technique for antenna arrays.

SUMMARY

Some embodiments advantageously provide a method and system for modification of a radiation pattern in at least one communication direction of at least one interference source.

One or more embodiments of the disclosure relate to creating or configuring one or more beamforming nulls that point or are directed to the one or more interference sources such as PIM sources. In the downlink, one or more transmit nulls or very lower power signals can be generated in the communication direction(s) of the interference source(s) so that these interference sources such as PIM sources are not excited or minimally excited, thereby helping reduce the interference level. Further, one or more receive nulls may be formed or configured in the uplink towards the one or more interference source(s) such as PIM source(s) to help reduce the interference level.

According to one aspect of the disclosure, a first radio node comprising processing circuitry is configured to configure the first radio node to: obtain a first interference subspace, obtain beamforming weights based on the first interference subspace where the beamforming weights configured to modify a radiation pattern in at least one communication direction of at least one interference source, and perform wireless communications based on the beamforming weights.

According to one embodiment of this aspect, the first interference subspace is an uplink interference subspace; and the modified radiation pattern being in a downlink interference subspace. According to one embodiment of this aspect, the processing circuitry is further configured to configure the first radio node to: obtain an estimate of the downlink interference subspace based on the uplink interference subspace where the obtaining of the beamforming weights being based on the estimate of the downlink interference subspace. According to one embodiment of this aspect, the uplink interference subspace corresponds to an uplink set of eigenvectors.

According to one embodiment of this aspect, the modified radiation pattern in at least one communication direction of at least one interference source is configured to reduce the downlink transmission radiation pattern in at least one communication direction of the at least one interference source. According to one embodiment of this aspect, the at least one interference source is at least one passive intermodulation, PIM, source. According to one embodiment of this aspect, the first interference subspace is an uplink subspace where the modified radiation pattern being in an uplink interference subspace.

According to one embodiment of this aspect, the uplink interference subspace corresponds to a plurality of dominant eigenvectors. According to one embodiment of this aspect, the modified radiation pattern in at least one communication direction of at least one interference source is configured to reduce the uplink receive radiation pattern in at least one communication direction of the at least one interference source. According to one embodiment of this aspect, the uplink interference subspace is determined by: determining a signal subspace corresponding to a plurality of communication directions of a plurality of interference sources including the at least one interference source where the signal subspace corresponding to a first plurality of eigenvectors, generating a second radio node signal subspace based on predetermined second radio nodes where the second radio node signal subspace corresponding to a second plurality of eigenvectors, generating a vector of a plurality of correlation coefficients based on the signal subspace and second radio node signal subspace, and removing eigenvectors from the signal subspace corresponding to the signal correlation coefficients that meet a predefined threshold. The remaining eigenvectors from the signal subspace correspond to the uplink interference subspace.

According to one embodiment of this aspect, the uplink interference subspace is determined by: generating a second radio node uplink signal subspace based on predetermined second radio nodes, generating a total uplink signal subspace where the uplink interference subspace being based on the second radio node uplink signal subspace and the total uplink signal subspace, generating a vector of correlation coefficients based on the second radio node uplink signal subspace and the total uplink signal subspace where the uplink interference subspace corresponds to a portion of the total uplink signal subspace associated with correlation coefficients having values below a predefined threshold. According to one embodiment of this aspect, the uplink interference subspace is obtained by: generating a second radio node uplink signal subspace based on predetermined second radio nodes, a contribution of the predetermined second radio nodes to a total received signal corresponds to a projection of a total received signal onto the second radio node uplink signal subspace, generating a residual quantity by subtracting the contribution of the predetermined second radio nodes from the total received signal where the residual quantity corresponding to an uplink vector of uplink noise plus interference, and where the uplink interference subspace being based on the residual quantity.

According to one embodiment of this aspect, the uplink interference subspace is obtained by: generating a residual quantity by subtracting a contribution of predetermined second radio nodes from a total received signal of pilot resource elements where the residual quantity corresponds to an uplink vector of an uplink noise plus interference, and the uplink interference subspace being generated based on the residual quantity. According to one embodiment of this aspect, the second radio node signal subspace corresponds to a set of uplink codebooks. According to one embodiment of this aspect, the radiation pattern is modified in the at least one communication direction of at least one interference source by removing a signal contribution that lies in an estimated downlink interference subspace by performing a projection. According to one embodiment of this aspect, the first interference subspace is used to modify the radiation pattern in the at least one communication direction of at least one interference source in more than one radio communication channel located in the same or in different radio frequency communication bands. According to one embodiment of this aspect, the wireless communications based on the beamforming weights are configured to be of similar power and 180 degrees out of phase with other wireless communications at the at least one interference source.

According to another aspect of the disclosure, a method for a first radio node is provided. A first interference subspace is obtained. Beamforming weights are obtained based on the first interference subspace, the beamforming weights configured to modify a radiation pattern in at least one communication direction of at least one interference source. Wireless communications are performed based on the beamforming weights.

According to one embodiment of this aspect, the first interference subspace is an uplink interference subspace, and the modified radiation pattern being in a downlink interference subspace. According to one embodiment of this aspect, an estimate of the downlink interference subspace is obtained based on the uplink interference subspace where the obtaining of the beamforming weights being based on the estimate of the downlink interference subspace. According to one embodiment of this aspect, the uplink interference subspace corresponds to an uplink set of eigenvectors.

According to one embodiment of this aspect, the modified radiation pattern in at least one communication direction of at least one interference source is configured to reduce the downlink transmission radiation pattern in at least one communication direction of the at least one PIM source. According to one embodiment of this aspect, the at least one interference source is at least one passive intermodulation, PIM, source. According to one embodiment of this aspect, the first interference subspace is an uplink subspace where the modified radiation pattern being in an uplink interference subspace.

According to one embodiment of this aspect, the uplink interference subspace corresponds to a plurality of dominant eigenvectors. According to one embodiment of this aspect, the modified radiation pattern in at least one communication direction of at least one interference source is configured to reduce the uplink receive radiation pattern in at least one communication direction of the at least one interference source. According to one embodiment of this aspect, the uplink interference subspace is determined by: determining a signal subspace corresponding to a plurality of communication directions of a plurality of interference sources including the at least one interference source where the signal subspace corresponding to a first plurality of eigenvectors, generating a second radio node signal subspace based on predetermined second radio nodes where the second radio node signal subspace corresponding to a second plurality of eigenvectors, generating a vector of a plurality of correlation coefficients based on the signal subspace and second radio node signal subspace, removing eigenvectors from the signal subspace corresponding to the signal correlation coefficients that meet a predefined threshold where the remaining eigenvectors from the signal subspace corresponding to the uplink interference subspace.

According to one embodiment of this aspect, the uplink interference subspace is determined by: generating a second radio node uplink signal subspace based on predetermined second radio nodes, generating a total uplink signal subspace, where the uplink interference subspace being based on the second radio node uplink signal subspace and the total uplink signal subspace, generating a vector of correlation coefficients based on the second radio node uplink signal subspace and the total uplink signal subspace where the uplink interference subspace corresponds to a portion of the total uplink signal subspace associated with correlation coefficients having values below a predefined threshold.

According to one embodiment of this aspect, the uplink interference subspace is obtained by: generating a second radio node uplink signal subspace based on predetermined second radio nodes where a contribution of the predetermined second radio nodes to a total received signal corresponds to a projection of a total received signal onto the second radio node uplink signal subspace, generating a residual quantity by subtracting the contribution of the predetermined second radio nodes from the total received signal where the residual quantity corresponding to an uplink vector of uplink noise plus interference, and the uplink interference subspace being based on the residual quantity. According to one embodiment of this aspect, the uplink interference subspace is obtained by: generating a residual quantity by subtracting a contribution of predetermined second radio nodes from a total received signal of pilot resource elements where the residual quantity corresponding to an uplink vector of an uplink noise plus interference. The uplink interference subspace is generated based on the residual quantity. According to one embodiment of this aspect, the second radio node signal subspace corresponds to a set of uplink codebooks.

According to one embodiment of this aspect, the radiation pattern is modified in the at least one communication direction of at least one interference source by removing a signal contribution that lies in an estimated downlink interference subspace by performing a projection. According to one embodiment of this aspect, the first interference subspace is used to modify the radiation pattern in the at least one communication direction of at least one interference source in more than one radio communication channel located in the same or in different radio frequency communication bands. According to one embodiment of this aspect, the wireless communications based on the beamforming weights are configured to be of similar power and 180 degrees out of phase with other wireless communications at the at least one interference source.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a diagram of correlation coefficients according to some embodiments of the present disclosure;

DETAILED DESCRIPTION

Figure 1:
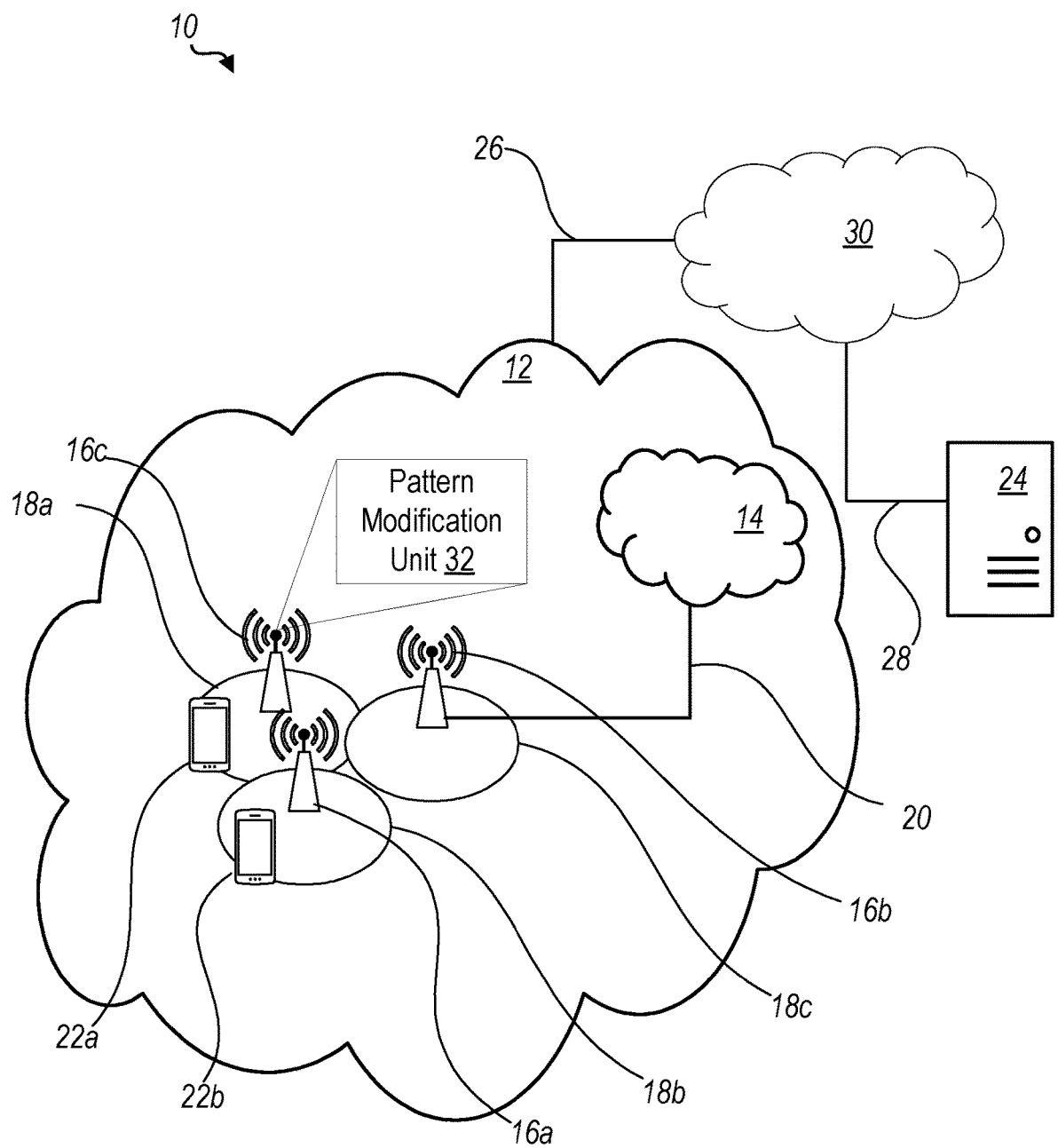
FIG. 1 is a schematic diagram of an exemplary network architecture illustrating a communication system connected via an intermediate network to a host computer according to the principles in the present disclosure.

As discussed above, some existing PIM mitigation/cancellation techniques suffer from one or more problems. The teachings of the disclosure solve at least in part one problem with these one or more existing PIM mitigation/cancellation techniques. In particular, one or more embodiments of the disclosure relate to a layer-domain interference mitigation technique. Unlike some existing PIM mitigation/cancellation techniques, the layer-domain interference mitigation technique described herein provides one or more of the following advantages:

The layer-domain interference mitigation technique is agnostic of one or more of the following parameters:
  The order of the non-linear terms involved in the process.
  The number of DL signal combinations based one or more of polarity, frequency and delayed signal cross-terms.
  The number of intermodulation bands involved in the process.
The layer-domain interference mitigation technique may be implemented at the baseband rate which helps maintain a low implementation cost.
Scalable: the layer-domain interference mitigation technique may be configured to support multiple deployment scenarios (i.e., different number of antennas and/or UL channels).
The layer-domain interference mitigation technique may also be used to steer one or more nulls (or very low power signals) in the one or more communication directions of one or more interference sources such as interfering radio nodes (e.g., user equipments) that may be located in adjacent cells, thereby helping reduce interference. In one or more embodiments, steering of one or more nulls (or very lower power signals) in the one or more communication directions corresponds to reducing the uplink receive and/or downlink transmission radiation pattern.
The layer-domain interference mitigation technique may be used to reduce the interference level in a reciprocity-based time-division duplex (TDD) systems.
The layer-domain interference mitigation technique can be used for steering one or more nulls (or very low power signals) at one or more interfering sources in codebook-based transmissions, thereby helping reduce interference.

In one or more embodiments, the layer-domain interference mitigation technique is based on subspace tracking, i.e., one or more subspace tracking algorithms. In general, subspace tracking algorithms play a role in a variety of adaptive subspace processes. In one or more embodiments described herein, one or more subspace tracking algorithms may be implemented. One or more of these subspace tracking algorithms may be used implemented to acquire/obtain and/or track one or more subspaces described herein such as obtaining and/or tracking dominant eigenvectors that may correspond to an interference subspace described herein. Some examples of subspace tracking algorithms may include one or more principle subspace trackers (PST) such as projection approximation subspace tracking using deflation (PASTD), Subspace Projection (SP) algorithm, etc. that may be configured for obtaining and/or tracking a subspace. One advantage of using the subspace tracking algorithms as described herein is that it makes the concept of determining a subspace such as the interference subspace practical by significantly reducing the implementation cost, e.g., requires less processing resources.

Before describing in detail exemplary embodiments, it is noted that the embodiments reside primarily in combinations of apparatus components and processing steps related to the modification of a radiation pattern in at least one communication direction of at least one interference source. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "first radio node" used herein can be any kind of radio node comprised in a radio network which may further comprise any of network node, radio base station, base station, base transceiver station (BTS), first radio node controller (BSC), radio network controller (RNC), gNB, evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The first radio node may also comprise test equipment. The term "radio node" used herein may be used to also denote a user equipment (UE)/wireless device or a radio network node.

In some embodiments, the "second radio node" herein can be any type of radio node capable of communicating with a first radio node or another user equipment (UE) or wireless device over radio signals. The second radio node may also be a radio communication device, user equipment, target device, device to device (D2D) radio node, wireless device, machine type radio node or radio node capable of machine to machine communication (M2M), low-cost and/or low-complexity radio node, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. Similarly, functions and descriptions attributed to the "first" radio node can be performed by the "second" radio node, and vice versa. In other words, in some embodiments, the "first" radio node can be the "second" radio node, and the "second" radio node can be the "first" radio node.

Note that although terminology from one particular wireless system, such as, for example, 3GPP Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a second radio node such as a user equipment or a first radio node such as a network node may be distributed over a plurality of second radio nodes and/or first radio nodes. In other words, it is contemplated that the functions of the first radio node and second radio node described herein are not limited to performance by a single physical device and, in fact, can be distributed among several physical devices.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A channel may generally be a logical or physical channel. A channel may comprise and/or be arranged on one or more carriers, in particular a plurality of subcarriers. A wireless communication network may comprise at least one first radio node, in particular a first radio node as described herein. A second radio node connected or communicating with a network may be considered to be connected or communicating with at least one first radio node, in particular any one of the first radio nodes described herein.

A cell may be generally a communication cell, e.g., of a cellular or mobile communication network, provided by a radio node. A serving cell may be a cell on or via which a first radio node (the node providing or associated to the cell, e.g., base station, gNB or eNodeB) transmits and/or may transmit data (which may be data other than broadcast data) to a second radio node, in particular control and/or user or payload data, and/or via or on which a second radio node transmits and/or may transmit data to the radio node; a serving cell may be a cell for or on which the second radio node is configured and/or to which it is synchronized and/or has performed an access procedure, e.g., a random access procedure, and/or in relation to which it is in a RRC_connected or RRC_idle state, e.g., in case the node and/or user equipment and/or network follow LTE based standard or NR based standards. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a second radio node, in particular a base station, gNB or eNodeB. An uplink direction may refer to a data transfer direction from a second radio node to a first radio node, e.g., base station, gNB and/or relay station. A downlink direction may refer to a data transfer direction from a first radio node, e.g., base station, gNB and/or relay node, to a second radio node. UL and DL may be associated to different frequency resources, e.g., carriers and/or spectral bands. A cell may comprise at least one uplink carrier and at least one downlink carrier, which may have different frequency bands. A second radio node, e.g., a base station, gNB or eNodeB, may be adapted to provide and/or define and/or control one or more cells, e.g., a PCell and/or a LA cell.

Configuring a second radio node may involve instructing and/or causing the second radio node to change its configuration, e.g., at least one setting and/or register entry and/or operational mode. A second radio node may be adapted to configure itself, e.g., according to information or data in a memory of the second radio node. Configuring a second radio node by another device or node or a network may refer to and/or comprise transmitting information and/or data and/or instructions to the second radio node by the other device or node or the network, e.g., allocation data (which may also be and/or comprise configuration data) and/or scheduling data and/or scheduling grants. Configuring a second radio node may include sending allocation/configuration data to the second radio node indicating which modulation and/or encoding to use. A second radio node may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of first radio nodes 16a, 16b, 16c (referred to collectively as first radio nodes 16, such as NBs, eNBs, gNBs or other types of wireless access points, each defining a corresponding coverage area 18a, 18b, 18c (referred to collectively as coverage areas 18). Each first radio node 16a, 16b, 16c is connectable to the core network 14 over a wired or wireless connection 20. A second radio node 22a located in coverage area 18a is configured to wirelessly connect to, or be paged by, the corresponding first radio node 16c. A second radio node 22b in coverage area 18b is wirelessly connectable to the corresponding first radio node 16a. While a plurality of second radio nodes 22a, 22b (collectively referred to as second radio nodes 22) are illustrated in this example, the disclosed embodiments are equally applicable to a situation where a sole second radio node is in the coverage area or where a sole second radio node is connecting to the corresponding first radio node 16. Note that although only two second radio nodes 22 and three first radio nodes 16 are shown for convenience, the communication system may include many more second radio nodes 22 and first radio nodes 16.

Also, it is contemplated that a second radio node 22 can be in simultaneous communication and/or configured to separately communicate with more than one first radio node 16 and more than one type of first radio node 16. For example, a second radio node 22 can have dual connectivity with a first radio node 16 that supports LTE and the same or a different first radio node 16 that supports NR. As an example, second radio node 22 can be in communication with an eNB for LTE/E-UTRAN and a gNB for New radio (NR)/Next Generation Radio Access Network (NG-RAN).

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected second radio nodes 22a, 22b and the host computer 24. The connectivity may be described as an over-the-top (OTT) connection. The host computer 24 and the connected second radio nodes 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a first radio node 16 may not or need not be informed about the past routing of an incoming downlink communication with data originating from a host computer 24 to be forwarded (e.g., handed over) to a connected second radio node 22a.

Similarly, the first radio node 16 need not be aware of the future routing of an outgoing uplink communication originating from the second radio node 22a towards the host computer 24.

A first radio node 16 is configured to include a beamforming unit 32 which is configured to modify a radiation pattern in at least one communication direction of at least one interference source, as described herein. A second radio node 22 may be configured to include a one or more units which are configured to perform one or more second radio node functions as described herein.

Example implementations, in accordance with an embodiment, of the second radio node 22, first radio node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a second radio node 22 connecting via an OTT connection 52 terminating at the second radio node 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the first radio node 16 and or the second radio node 22. The processing circuitry 42 of the host computer 24 may include an information unit 54 configured to enable the service provider to at least partially determine and/or provide information related to the modification of a radiation pattern in at least one communication direction of at least one interference source.

The communication system 10 further includes a first radio node 16 provided in a communication system 10 and comprising hardware 58 enabling it to communicate with the host computer 24 and with the second radio node 22. The hardware 58 may include a communication interface 60 for setting up and maintaining a wired or wireless connection with an interface of a different communication device of the communication system 10, as well as a radio interface 62 for setting up and maintaining at least a wireless connection 64 with a second radio node 22 located in a coverage area 18 served by the first radio node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the first radio node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the first radio node 16 further has software 74 stored internally in, for example, memory 72, or stored in external memory (e.g., database, storage array, network storage device, etc.) accessible by the first radio node 16 via an external connection. The software 74 may be executable by the processing circuitry 68. The processing circuitry 68 may be configured to control any of the methods and/or processes described herein and/or to cause such methods, and/or processes to be performed, e.g., by first radio node 16. Processor 70 corresponds to one or more processors 70 for performing first radio node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to first radio node 16. For example, processing circuitry 68 of the first radio node 16 may include beamforming unit 32 configured to modify a radiation pattern in at least one communication direction of at least one interference source.

The communication system 10 further includes the second radio node 22 already referred to. The second radio node 22 may have hardware 80 that may include a radio interface 82 configured to set up and maintain a wireless connection 64 with a first radio node 16 serving a coverage area 18 in which the second radio node 22 is currently located. The radio interface 82 may be formed as or may include, for example, one or more RF transmitters, one or more RF receivers, and/or one or more RF transceivers.

The hardware 80 of the second radio node 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the second radio node 22 may further comprise software 90, which is stored in, for example, memory 88 at the second radio node 22, or stored in external memory (e.g., database, storage array, network storage device, etc.) accessible by the second radio node 22. The software 90 may be executable by the processing circuitry 84. The software 90 may include a client application 92. The client application 92 may be operable to provide a service to a human or non-human user via the second radio node 22, with the support of the host computer 24. In the host computer 24, an executing host application 50 may communicate with the executing client application 92 via the OTT connection 52 terminating at the second radio node 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by second radio node 22. The processor 86 corresponds to one or more processors 86 for performing second radio node 22 functions described herein. The second radio node 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to second radio node 22. For example, the processing circuitry 84 of the second radio node 22 may include one or more units that are configured to perform one or more second radio node 22 functions are described herein.

Figure 2:
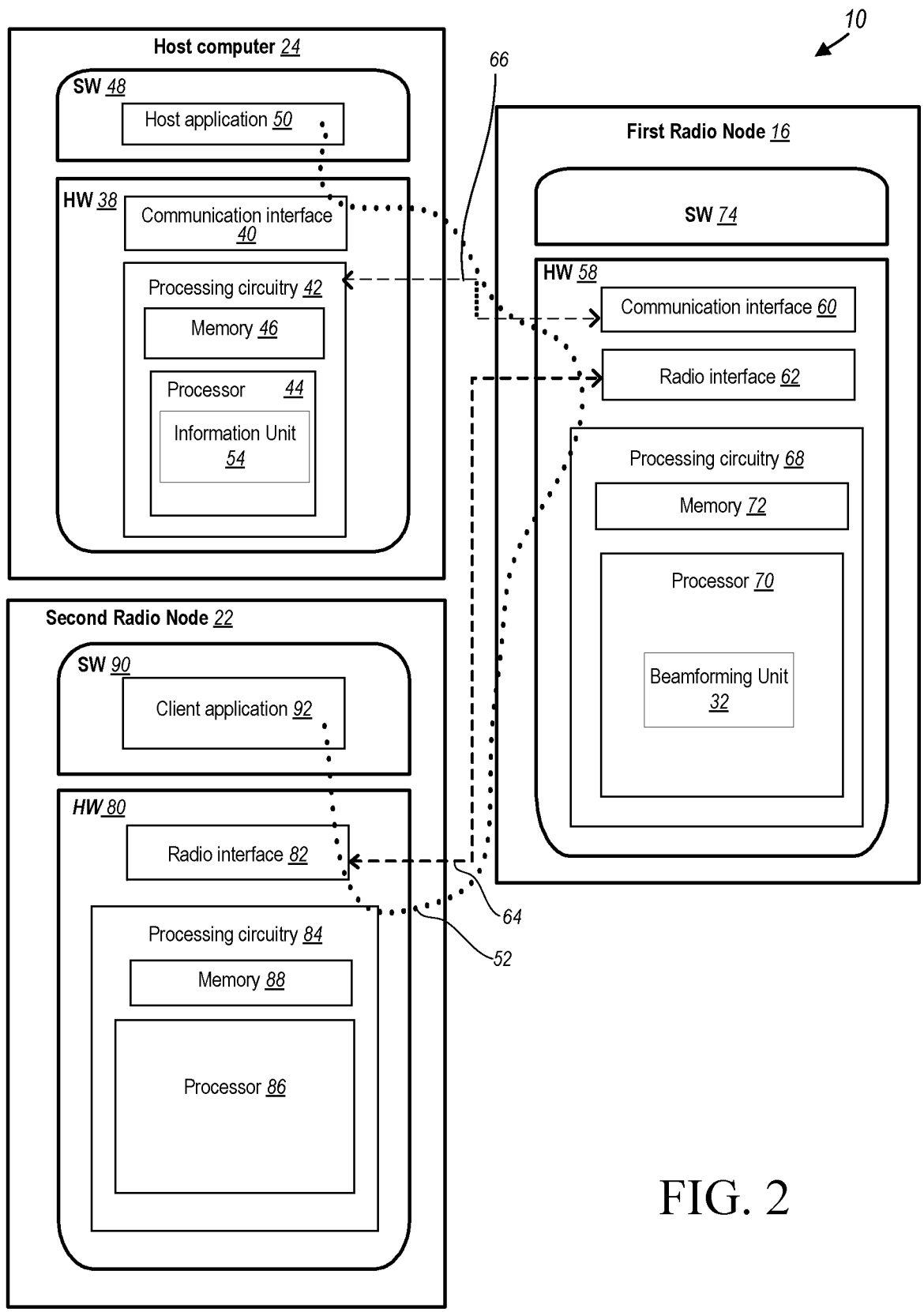
FIG. 2 is a block diagram of a host computer communicating via a first radio node with a second radio node over an at least partially wireless connection according to some embodiments of the present disclosure.

In some embodiments, the inner workings of the first radio node 16, second radio node 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the second radio node 22 via the first radio node 16, without explicit reference to any intermediary devices and the precise routing of messages via these devices. Network infrastructure may determine the routing, which it may be configured to hide from the second radio node 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the second radio node 22 and the first radio node 16 is in accordance with the teachings of the embodiments described throughout this disclosure. One or more of the various embodiments improve the performance of OTT services provided to the second radio node 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and second radio node 22, in response to variations in the measurement results. The measurement procedure and/or the network functionality for reconfiguring the OTT connection 52 may be implemented in the software 48 of the host computer 24 or in the software 90 of the second radio node 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the first radio node 16, and it may be unknown or imperceptible to the first radio node 16. Some such procedures and functionalities may be known and practiced in the art. In certain embodiments, measurements may involve proprietary second radio node signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the second radio node 22. In some embodiments, the cellular network also includes the first radio node 16 with a radio interface 62. In some embodiments, the first radio node 16 is configured to, and/or the first radio node's 16 processing circuitry 68 is configured to perform the functions and/or methods described herein for preparing/initiating/maintaining/supporting/ending a transmission to the second radio node 22, and/or preparing/terminating/maintaining/supporting/ending in receipt of a transmission from the second radio node 22.

In some embodiments, the host computer 24 includes processing circuitry 42 and a communication interface 40 that is configured to a communication interface 40 configured to receive user data originating from a transmission from a second radio node 22 to a first radio node 16. In some embodiments, the second radio node 22 is configured to, and/or comprises a radio interface 82 and/or processing circuitry 84 configured to perform the functions and/or methods described herein for preparing/initiating/maintaining/supporting/ending a transmission to the first radio node 16, and/or preparing/terminating/maintaining/supporting/ending in receipt of a transmission from the first radio node 16.

Although FIGS. 1 and 2 show various "units" such as beamforming unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Having generally described arrangements for modifying of a radiation pattern in at least one communication direction of at least one interference source to thereby mitigate the effects of interference such as PIM, details for these arrangements, functions and processes are provided as follows, and which may be implemented by the first radio node 16, second radio node 22 and/or host computer 24.

Figure 3:
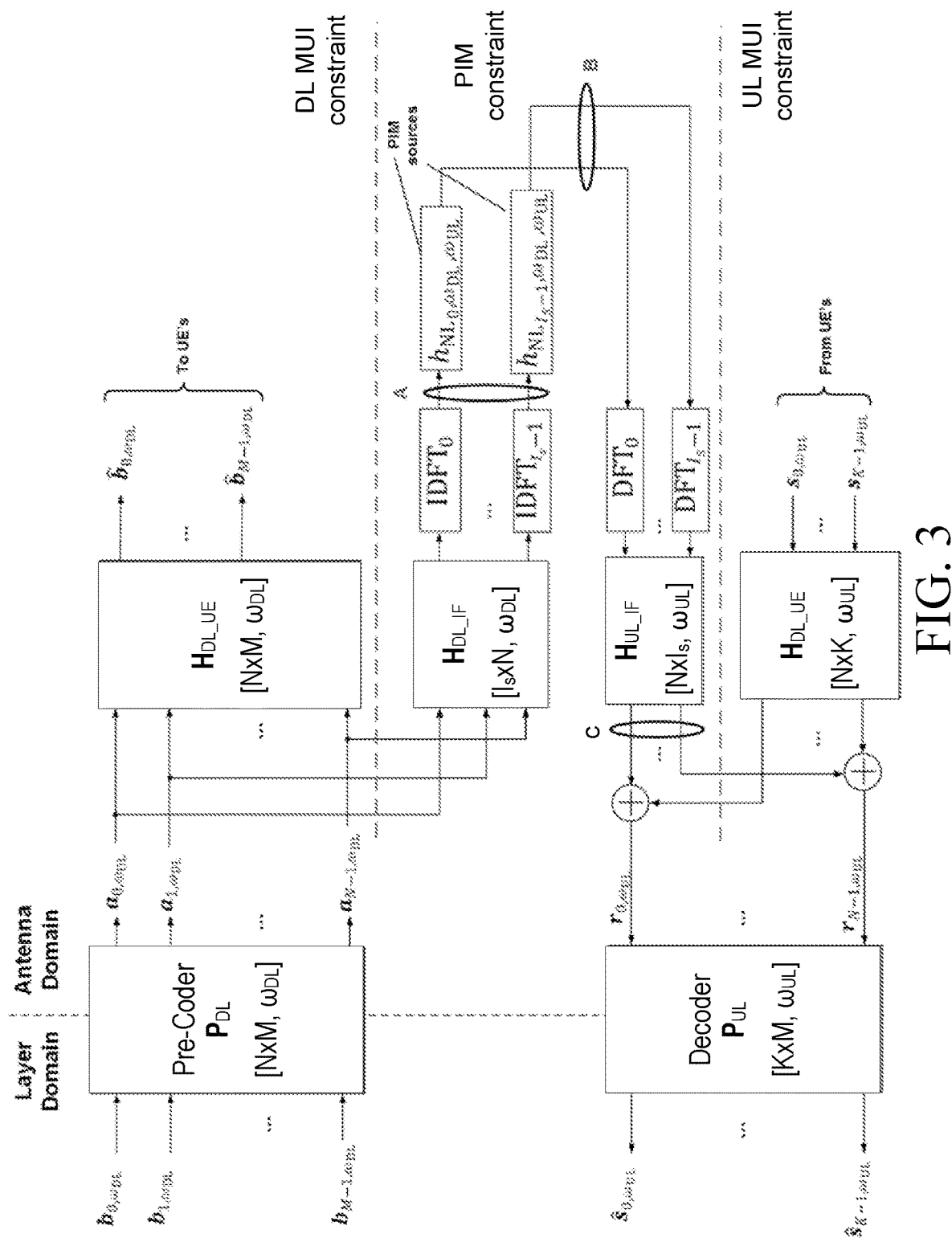
FIG. 3 is a mathematical system model of a massive-MIMO frequency-division duplex (FDD) system with interference such as PIM interference according to some embodiments of the present disclosure.

A mathematics-based approach to modification of the radiation pattern is described with reference to FIG. 3. More specifically, FIG. 3 is a mathematical system model of an example massive-MIMO frequency-division duplex (FDD) system with interference such as PIM interference. The system parameters of the system model include:

M downlink Multiple-Input-Multiple-Output (MIMO) layers.

K uplink MIMO layers.

N downlink and uplink (UL) first radio node antennas.

$\omega_{DL}$ is the downlink (DL) channel frequency.

$\omega_{UL}$ is the uplink channel frequency.

$I_S$ is the channel dimensions impacted by interference—which could correspond to the total number of interference sources such as the PIM sources.

$N_L$ is the non-linear order of the interference sources such as PIM sources.

The system model variables are described as:

b is a M ×1 vector of the DL control and traffic signaling in the layer domain.

a is a N ×1 vector of the pre-coded DL control and traffic signaling in the antenna domain.

s is a K ×1 vector of the UL control and traffic signaling in the layer domain at the second radio nodes 22 such as user equipments.

r is a N ×1 vector of the UL received control and traffic signaling in the antenna domain at the first radio node 16.

$H_{DL\_UE}$ is a M×N matrix of the channel response from the first radio node 16 to the second radio nodes 22 for each of the downlink subcarriers.

$H_{UL\_UE}$ is a N×K matrix of the channel response from the second radio nodes 22 to the first radio node 16 for each of the uplink subcarriers.

$H_{DL\_IF}$ is a $I_S$×N matrix of the channel response from the first radio node 16 to the interference sources (e.g., PIM sources) for each of the downlink subcarriers.

$H_{UL\_IF}$ is a N×$I_S$ matrix of the channel response from the interference sources to the first radio node 16 (e.g., base station) for each of the uplink subcarriers.

$h_{NL}$ are some non-linear time-domain models of the interference sources.

$P_{DL}$ is a N×M matrix of the beamforming weights for each of the DL subcarriers (Physical Resource Block (PRB) granularity may be used to reduce the implementation cost).

$P_{UL}$ is a K×N matrix of the beamforming weights for each of the UL subcarriers (PRB granularity may be used to reduce the implementation cost).

Downlink Reciprocity-Based Null Steering

In the downlink, some "transmit nulls" or very low power DL signals may be created at the PIM sources through beamforming so that the PIM sources may not be excited into generating PIM signals, thereby reducing PIM interference for the uplink MIMO layers.

Massive-MIMO systems may correspond to some underdetermined systems of equation that may have, in theory, an infinite number of solutions. The teachings of the disclosure introduce the treatment of the DL beamforming problem as constrained optimization between a PIM requirement and a Multi-User Interference (MUI) requirement.

To satisfy the two conditions, the downlink beamforming solution a must minimize the following cost function:

$$(P_{DL}) \begin{cases} \underset{a}{\text{Minimize}} & \frac{1}{2}\|H_{DL\_IF} \cdot a\|^2 \\ \text{subject to} & b = H_{DL\_UE} \cdot a \end{cases} \quad (1)$$

The first line of the $P_{DL}$ cost function helps ensure that the downlink signal energy is minimized at the PIM sources while the second line states that the downlink communication layers are transmitted to the intended second radio nodes 22 without any cross-layer interference (MUI condition). The optimization problem of equation (1) can be solved using Lagrangian multipliers and is referred to as the Constrained Least Norm (CLEAN) beamforming algorithm:

$$L(\alpha,\lambda) = \frac{1}{2}\|H_{DL\_IF} \cdot \alpha\|^2 + \lambda^T(b - H_{DL\_UE} \cdot \alpha) \quad (2)$$

Where $\lambda$ is a M×1 vector of Lagrange multipliers and $(\cdot)^T$ is a vector transpose operation. Setting to zero the two partial derivatives of the Lagrange function (2) with respect to the $\alpha$ and $\lambda$ variables produces:

$$\nabla_\alpha L = H_{DL\_IF}{}^H \cdot H_{DL\_IF} \cdot \alpha - H_{DL\_UE}{}^H \cdot \lambda = 0 \quad (3)$$

$$\nabla_\lambda L = b - H_{DL\_UE} \cdot \alpha = 0 \quad (4)$$

Where the $(\cdot)^H$ operator denotes the matrix Hermitian (i.e., complex conjugate) transpose.

Isolating $\alpha$ in (3) yields:

$$\alpha = (H_{DL\_IF}{}^H \cdot H_{DL\_IF})^{-1} \cdot H_{DL\_UE}{}^H \cdot \lambda \quad (5)$$

Substituting (5) into (4) to find $\lambda$:

$$\lambda = (H_{DL\_UE} \cdot (H_{DL\_IF}{}^H \cdot H_{DL\_IF})^{-1} \cdot H_{DL\_UE}{}^H)^{-1} \cdot b \quad (6)$$

Substituting (6) back into (5):

$$\alpha = (H_{DL\_IF}{}^H \cdot H_{DL\_IF})^{-1} \cdot H_{DL\_UE}{}^H \cdot (H_{DL\_UE} \cdot (H_{DL\_IF}{}^H \cdot H_{DL\_IF})^{-1} \cdot H_{DL\_UE}{}^H)^{-1} \cdot b \quad (7)$$

To simplify the notation, the downlink PIM channel covariance matrix is written as:

$$R_{DL\_IF} = H_{DL\_IF}{}^H \cdot H_{DL\_IF} \quad (8)$$

Finally, substituting (8) into (7) leads to:

$$\alpha = (R_{DL\_IF})^{-1} \cdot H_{DL\_UE}{}^H \cdot (H_{DL\_UE} \cdot (R_{DL\_IF})^{-1} \cdot H_{DL\_UE}{}^H)^{-1} \cdot b \quad (9)$$

The downlink channel matrix $H_{DL\_IF}$ between the second radio node 22 and the PIM sources is unknown. However, equation (9) does not require the knowledge of the PIM channel but only of its covariance matrix $R_{DL\_IF}$, which can also be written in terms of its eigenvectors:

$$R_{DL\_IF} = U \cdot \Sigma \cdot U^H \quad (10)$$

Where:
U is a N×N matrix formed by the N eigenvectors $[u_0, \ldots, u_{N-1}]$:
  The signal subspace of the interferers' channel covariance matrix—the interference subspace—corresponds to the $I_S$ dominant eigenvectors $U_{DL\_IF} = [u_0, \ldots, u_{I_S}-1]$.
  The noise subspace of the interferers' channel covariance matrix corresponds to the remaining eigenvectors $U_{DL\_Noise} = [u_{I_S}, \ldots, u_{N-1}]$.
$\Sigma$ is a N×N diagonal matrix with the diagonal elements set to the N downlink interferers' channel covariance matrix eigenvalues $\lambda_0, \ldots, \lambda_{N-1}$. The first elements $\lambda_i$, $i=0, \ldots, I_S-1$ are the interferers' eigenvalues while the remaining entries $\lambda_i$, $i=I_S, \ldots, N-1$ are noise eigenvalues.

In a Frequency Division Duplex (FDD) system, the spatial behavior experienced by the antenna array of the first radio node 16 (i.e., directions of arrival and departure of communication signals) is similar in both the uplink and downlink. In other words, the dominant downlink interference eigenvectors—which correspond to the directions of departure at the antenna array—can be estimated using the uplink interference directions of arrival. The estimated downlink interference covariance matrix $\hat{R}_{DL\_IF}$ can be expressed in terms of the uplink interferers' subspace as follows:

$$\hat{R}_{DL\_IF} = R_{UL\_IF}^T \quad (11)$$
$$= \left( U_{UL\_IF} \cdot \sum\nolimits_{UL\_IF} \cdot U_{UL\_IF}^H \right)^T$$
$$= (U_{UL\_IF}^H)^T \cdot \sum\nolimits_{UL\_IF}^T \cdot U_{UL\_IF}^T$$
$$= \overline{U}_{UL\_IF} \cdot \sum\nolimits_{UL\_IF} \cdot U_{UL\_IF}^T$$

The transpose operation on the first line of equation (11) implements the uplink-to-downlink channel conversion. The $\overline{(\cdot)}$ operator in equation (11) represents the matrix conjugation without transpose.

Eigenvectors Acquisition and Tracking

The process for obtaining and tracking the uplink interferers' eigenvectors can be divided into two distinct scenarios:

Scenario 1. No Uplink Signal/Downlink Signal Present
a. This is a situation where the uplink received signal covariance matrix is formed as follows:

$$R_{UL} = E[r \cdot r^H] \quad (12)$$

Where $E[\cdot]$ denotes the expectation operator. Note that the OFDM resource elements that are used for the initial access such as the Physical Random-Access Channel (PRACH) may be excluded from this averaging process.
b. The $R_{UL}$ covariance matrix is then eigen decomposed and the resulting signal subspace $U_{UL\_IF} = [u_0, \ldots, u_{I_S}-1]$ corresponds to the directions of all interference sources including interference such as PIM, inter-cell interferences and any other interference. The noise subspace $U_{UL\_Noise} = [u_{I_S}, \ldots, u_{N-1}]$ of the $R_{UL}$ covariance matrix can be discarded.
c. The known uplink second radio node channel covariance matrix $R_{UL\_UE} = H_{UL\_UE} \cdot H_{UL\_UE}^H$ is also eigen decomposed to produce the known uplink second radio node (e.g., UE) signal subspace $U_{UL\_UE} = [u_0, \ldots, u_{K-1}]$.
d. A verification step may be performed to ensure that the acquired interference subspace does not overlap with the second radio node 22 signal subspace. The verification step may be performed by computing the cross-correlation matrix $R_{SS} \in \mathbb{C}^{I_S \times K}$ between the interference and the second radio node subspaces:

$$R_{SS} = U_{UL\_IF}^H \cdot U_{UL\_UE} \quad (13)$$

The vector of the correlation coefficients $c^T \in \mathbb{R}^{K \times 1}$ is calculated by selecting the maximum of the absolute values along the first dimension of the $R_{SS}$ matrix, which is illustrated in FIG. 4, and normalizing it by the number of antennae N:

$$c_j = \frac{\max(\text{abs}(f_{0:I_S-1,j}))}{N} \quad (14)$$

The elements from the $c^T$ vector may then be compared to a correlation threshold $Th_{corr}$. The eigenvectors with strong correlation coefficients exceeding the threshold $Th_{corr}$ are common to both the second radio node 22 and the interference subspaces. These eigenvectors are removed from the interference subspace in order to not reduce the radiation pattern in the direction of a scheduled second radio node 22. Those eigenvectors are set aside in a common subspace $U_{UE/interf}$ for further processing, and example of which is described in the "Downlink Null Creations—Multi-Array Cooperation" section.
e. The remaining interference subspace $U_{UL\_IF}$ can then be used as the orthonormal basis for building the $\hat{R}_{hd\ DL\_IF}$ matrix as per equation (11).

Scenario 2. Uplink and Downlink Signals Present

A. Technique 1
  i. The uplink received signal covariance matrix $R_{UL}$ is formed per equation (12)—excluding the PRACH channel.
  ii. $R_{UL}$ is eigen decomposed to produce the total uplink signal subspace $U_{UL\_S}$ and the corresponding vector of eigenvalues $\lambda_{UL\_S}$.
  iii. The known uplink second radio nodes channel covariance matrix $R_{UL\_UE} = H_{UL\_UE} \cdot H_{UL\_UE}^H$ is also eigen decomposed to produce the known uplink second radio nodes signal subspace $U_{UL\_UE} = [u_0, \ldots, U_{K-1}]$ and the associated vector of eigenvalues $\lambda_{UL\_UE}$.
  iv. The total uplink signal subspace $U_{UL\_S}$ corresponds to the union between the known uplink second radio nodes signal subspace and the uplink interferers' signal subspace:

$$U_{UL\_S} = U_{UL\_UE} \cup U_{UL\_IF} \quad (15)$$

Therefore, the relative complement between the two sets of eigenvectors $U_{UL\_S}$ and $U_{UL\_UE}$ produces the interference signal subspace (assuming no common elements between $U_{UL\_IF}$ and $U_{UL\_UE}$):

$$(15) \Rightarrow U_{UL\_IF} = U_{UL\_S} \backslash U_{UL\_UE} \quad (16)$$

This may be accomplished by computing the cross-correlation matrix $R_{SS} \in \mathbb{C}^{K \times (K+I_S)}$ between the two signal subspaces:

$$R_{SS} = U_{UL\_UE}{}^H \cdot U_{UL\_S} \quad (17)$$

Then, the vector of the correlation coefficients $c_{vertical}{}^T \in \mathbb{R}^{(K+I_S) \times 1}$ is calculated by selecting the maximum of the absolute values along the first dimension of the $R_{SS}$ matrix and normalizing it by the number of antennas N:

$$c_{vertical,j} = \frac{\max(abs(f_{0:K-1,j}))}{N} \quad (18)$$

The vector of the correlation coefficients $c_{vertical}{}^T$ is sorted in ascending order:

$$c_{vertical\_sorted} = \text{sort}(c_{vertical}{}^T, \text{'ascending'}) \quad (19)$$

The columns of the total uplink signal subspace $U_{UL\_S}$ and the elements of the corresponding vector of eigenvalues $\lambda_{UL\_S}$ are reordered consistently with the above sorting process. The indices of the $I_S$ smallest correlation coefficients correspond to column indices of the interference subspace in the $U_{UL\_S}$ matrix.

v. The interference subspace that is produced by this technique may not contain eigenvectors that are also common to the second radio node 22 subspace. However, the existence of any such eigenvectors can be verified by comparing the eigenvalues—which correspond to the received power—of the total uplink signal $\lambda_{UL\_S}$ to those of the scheduled UE channel $\lambda_{UL\_UE}$. To do so, the second radio node 22 eigenvalues $\lambda_{UL\_UE}$ may also be sorted based on the strength of their associated correlation coefficients. Thus, the vector $c_{horizontal} \in \mathbb{R}^{K \times 1}$ is calculated by selecting the maximum of the absolute values along the second dimension of the $R_{SS}$ matrix this time and normalizing it by the number of antennas N:

$$c_{horizontal,i} = \frac{\max(abs(f_{i,0:K+I_S-1}))}{N} \quad (20)$$

The vector of the correlation coefficients $c_{horizontal}$ is sorted in ascending order:

$$c_{horizontal\_sorted} = \text{sort}(c_{horizontal}, \text{'ascending'}) \quad (21)$$

The corresponding vector of second radio nodes eigenvalues $\lambda_{UL\_UE}$ is reordered consistently with the above sorting process. Finally, the sorted vectors of eigenvalues are compared as follows:

$$\lambda_{UL\_S, I_S:I_S+K-1} - \lambda_{UL\_UE} > Th_{\Delta\lambda} \quad (22)$$

Some common interference/second radio node 22 eigenvectors are identified in the situation where the difference for some of the entries exceeds the tolerance threshold $Th_{\Delta\lambda}$. Those common eigenvectors are set aside in a common subspace $U_{UE/interf}$ for further processing, an example of which is described with respect to the "Downlink Null Creations—Multi-Array Cooperation" section.

Figure 5:
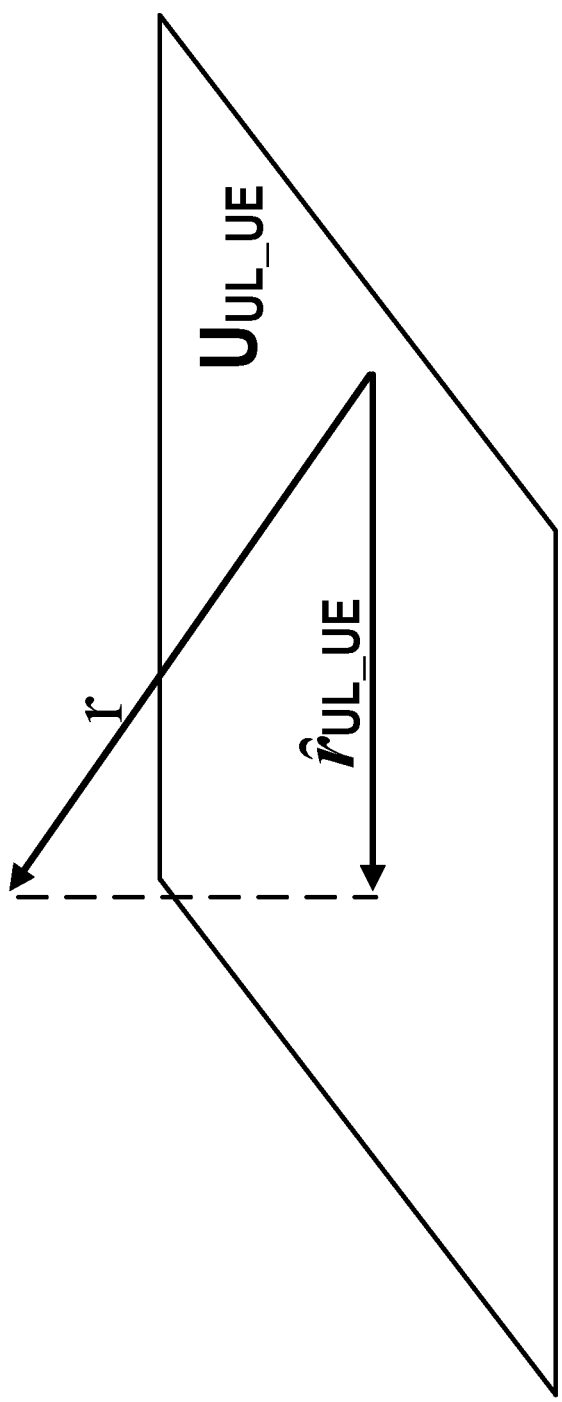
FIG. 5 is a diagram of a received signal projection onto a predefined second radio node subspace according to some embodiments of the present disclosure.

B. Technique 2
  i. The known uplink second radio nodes channel covariance matrix $R_{UL\_UE} = H_{UL\_UE} \cdot H_{UL\_UE}{}^H$ is eigen decomposed to produce the known uplink second radio nodes signal subspace $U_{UL\_UE} = [u_0, \ldots, u_{K-1}]$.
  ii. The contribution from the predetermined or known uplink second radio nodes 22, i.e., their received signal in the antenna domain, corresponds to the projection of the total received signal r onto the known uplink second radio nodes signal subspace $U_{UL\_UE}$ as illustrated in FIG. 5:

$$\hat{r}_{UL\_UE} = U_{UL\_UE} \cdot U_{UL\_UE}{}^H \cdot r \quad (23)$$

The residual quantity that is produced by subtracting the contribution of the known uplink second radio nodes 22 from the total received signal corresponds to the uplink vector of the noise plus interference:

$$r_{UL\_N\_IF} = r - \hat{r}_{UL\_UE} \quad (24)$$
$$= (I - U_{UL\_UE} \cdot U_{UL\_UE}^H) \cdot r$$

Where I is the N×N identity matrix.
  iii. The uplink noise plus interference covariance matrix $R_{UL\_N\_IF}$ is formed as follows—excluding the PRACH channel:

$$R_{UL\_N\_IF} = E[r_{UL\_N\_IF} \cdot r_{UL\_N\_IF}{}^H] \quad (25)$$

iv. $R_{UL\_N\_IF}$ is eigen decomposed to produce the interference subspace $U_{UL\_IF}$.
  v. The verification step of section Scenario 1(d) may be performed to help ensure that the acquired interference subspace does not overlap with the second radio nodes 22 signal subspace.
    Note that, in one or more embodiments, this technique may not be best suited for identifying common eigenvectors $U_{UE/interf}$ between the scheduled second radio nodes 22 and the interferers. Indeed, in the situation where some of the interferers have uplink directions of arrival that are similar to those of the second radio nodes 22, their contribution may also be projected—partly or in total—onto the second radio node 22 signal subspace. Thus, these sources of interference may have a high probability of going unnoticed during the verification step of section described in Scenario 1 (d).

C. Technique 3
  i. The contribution from the known uplink second radio nodes 22 is subtracted from the total received signal r of the pilot resource elements. The residual quantity corresponds to the uplink vector of the noise plus interference:

$$r_{UL\_N\_IF} = r - \hat{r}_{UL\_UE} \quad (26)$$
$$= r - \hat{H}_{UL\_UE} \cdot s_{UL\_UE}$$

ii. The uplink noise plus interference covariance matrix $R_{UL\_N\_IF}$ is formed as per equation (25)—excluding the PRACH channel.
  iii. $R_{UL\_N\_IF}$ is eigen decomposed to produce the interferers' subspace $U_{UL\_IF}$.
  iv. The known uplink second radio nodes channel covariance matrix $R_{UL\_UE} = H_{UL\_UE} \cdot H_{UL\_UE}{}^H$ is eigen decomposed to produce the known uplink second radio nodes signal subspace $U_{UL\_UE} = [u_0, \ldots, u_{K-1}]$.

v. The verification step of Scenario 1 (d) may be performed to help ensure that the acquired interference subspace does not overlap with the second radio node 22 signal subspace.

Codebook-Based Null Steering

The teachings described herein are compatible with codebook-based MIMO transmissions with some minor modifications. The algorithm steps for codebook-based precoding are described below:

a. The set of the used uplink codebooks $W_{UL\_CB} = [w_0, \ldots, w_{K-1}]^T \in \mathbb{C}^{K \times N}$ are set to correspond to the uplink second radio nodes' signal subspace $U_{UL\_UE}$ $$U_{UL\_UE} = W_{UL\_CB} \quad (27)$$

b. The uplink interferers' subspace $U_{UL\_IF}$ can then be determined using any of the techniques that are described in the Eigenvectors Acquisition and Tracking section.

c. The downlink transmission is generated by removing the signal contribution that lies in the interferers' subspace as follows:

$$\alpha = (I - \hat{U}_{UL\_IF} \cdot U_{UL\_IF}^T) \cdot W_{DL\_CB} \cdot b \quad (28)$$

Where I is the N×N identity matrix and $W_{DL\_CB} \in \mathbb{C}^{N \times M}$ is the matrix of the downlink codebook pre-coding weights.

The procedure of equation (28) may, in one or more embodiments, initially increase the noise and interference levels in the received layer-domain constellations at the second radio node(s) 22. However, the codebook selection may be an adaptive process such that the second radio node(s) 22 may adapt to the spatial constraints over time.

Uplink Null Steering

In the uplink, some receive nulls or very low power signals may be generated through beamforming in the directions of the interference sources (e.g., PIM sources) to help reduce interference for the uplink MIMO communication layers. The uplink cost function can be written as follows:

$$(G_{UL}) \begin{cases} \underset{P_{UL}}{\text{Minimize}} & \frac{1}{2} \|P_{UL} \cdot H_{UL\_IF}\|_{Fro}^2 \\ \text{subject to} & P_{UL} \cdot H_{UL\_UE} = I \end{cases} \quad (29)$$

Where the matrix $P_{UL} \in \mathbb{C}^{K \times N}$ corresponds to the uplink beamforming weights, $\|\cdot\|_{Fro}$ is the Frobenius norm and I is the K×K identity matrix.

The first line of the $G_{UL}$ cost function may ensure that the interferers' signal energy is minimized in the received layers while the second line removes the uplink cross-layer interferences between the scheduled second radio nodes 22 (MUI condition). The optimization problem of equation (29) can be solved using Lagrangian multipliers:

$$L(P_{UL}, \Lambda) = \frac{1}{2} \|P_{UL} \cdot H_{UL\_IF}\|_{Fro}^2 + \Lambda^T (P_{UL} \cdot H_{UL\_UE} - I) \quad (30)$$

Where Λ is a K×K matrix of Lagrange multipliers. Setting to zero the two partial derivatives of the Lagrange function (30) with respect to the $P_{UL}$ and Λ variables produces:

$$\nabla_{P_{UL}} L = H_{UL\_IF} \cdot H_{UL\_IF}^H \cdot P_{UL}^H + H_{UL\_UE} \cdot \Lambda = 0 \quad (31)$$

$$\nabla_\Lambda L = P_{UL} \cdot H_{UL\_UE} - I = 0 \quad (32)$$

Isolating $P_{UL}^H$, in (31) yields:

$$P_{UL}^H = -(H_{UL\_IF} \cdot H_{UL\_IF}^H)^{-1} \cdot H_{UL\_UE} \cdot \Lambda \quad (33)$$

Substituting (33) into (32) to find Λ:

$$\Lambda^H = -(H_{UL\_UE}^H \cdot (H_{UL\_IF} \cdot H_{UL\_IF}^H)^{-1} \cdot H_{UL\_UE})^{-1} \quad (34)$$

Note that both Λ and ($H_{UL\_IF} \cdot H_{UL\_IF}^H$) are Hermitian matrices, signifying that they are equal to their own complex-conjugate transposes (e.g.: $\Lambda = \Lambda^H$).

Substituting (34) back into (33):

(35)

$$P_{UL} = \left(-(H_{UL\_IF} \cdot H_{UL\_IF}^H)^{-1} \cdot H_{UL\_UE} \cdot A\right)^H$$
$$= \left(H_{UL\_UE}^H \cdot (H_{UL\_IF} \cdot H_{UL\_IF}^H)^{-1} \cdot H_{UL\_UE}\right)^{-1} \cdot H_{UL\_UE}^H \cdot (H_{UL\_IF} \cdot H_{UL\_IF}^H)^{-1}$$

To simplify the notation, the uplink interference channel covariance matrix is written as:

$$R_{UL\_IF} = H_{UL\_IF} \cdot H_{UL\_IF}^H \quad (36)$$

Finally, substituting (36) into (35) we obtain:

$$P_{UL} = (H_{UL\_UE}^H \cdot (R_{UL\_IF})^{-1} \cdot H_{UL\_UE})^{-1} \cdot H_{UL\_UE}^H \cdot (R_{UL\_IF})^{-1} \quad (37)$$

The uplink interferers' channel covariance matrix $R_{UL\_IF}$ is built from the interferers' subspace $U_{UL\_IF}$ as per the right-hand side of equation (11). The interferers' subspace $U_{UL\_IF}$ is in turn determined using any of the techniques described herein with respect to the Eigenvectors Acquisition and Tracking section.

Downlink Null Creations—Multi-Array Cooperation

Figure 6:
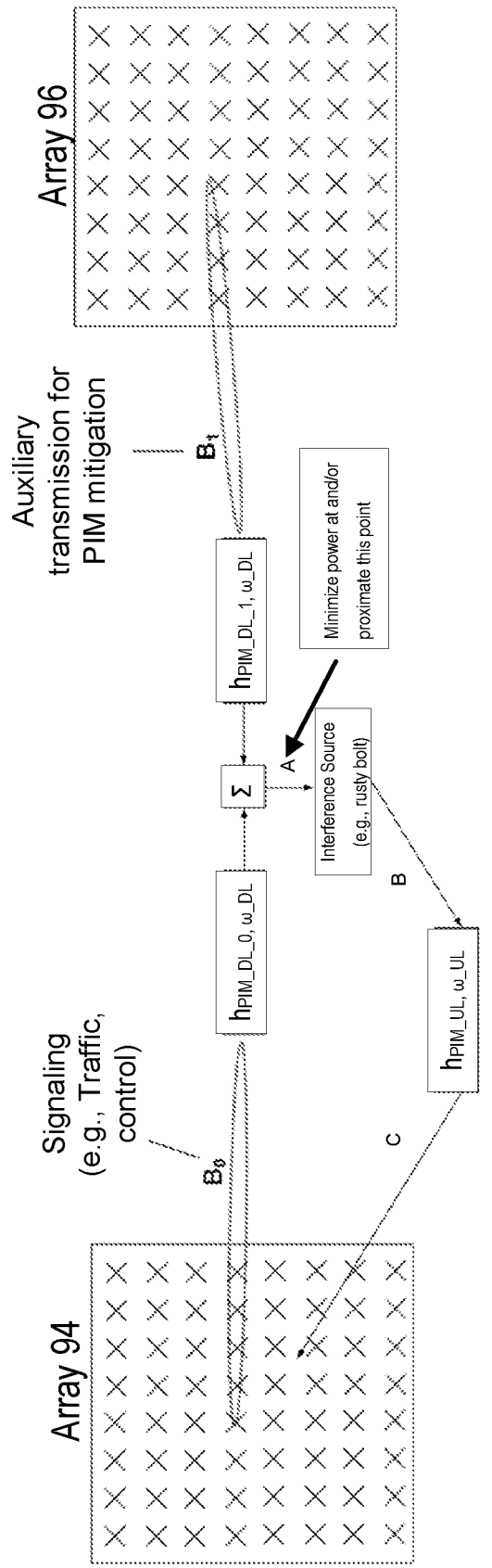
FIG. 6 is a diagram of multi-array cooperation according to some embodiments of the present disclosure.

In some cases, there may be instances where an antenna array may not be able to avoid transmitting in the direction of an interference source such as a PIM source. This may happen, for example, if second radio node 22 movement patterns in a given area pass by a PIM source in proximity of the array. In these situations, multi-array cooperation may be used where one or more secondary arrays create an auxiliary transmission directed at the PIM source in order to have two transmissions of similar amplitude that are out of phase by 180° at the PIM source such that these two transmissions cancel or nearly cancel each other as illustrated in FIG. 6. In one or more embodiments, "similar" amplitude or power may correspond to the amplitude/power of two or more transmissions being within a predefined amplitude/power quantity from each other.

Mathematically, eigenvectors of array 94 (illustrated in FIG. 6) that correspond to the "unavoidable" PIM sources that may be regarded as eigenvectors that are common to both the second radio node 22 and the interference subspaces. These common eigenvectors are referred to as the common subspace $U_{UE/interf}$. The total downlink covariance matrix for array 94 (illustrated in FIG. 6) can be written as:

$$R_{DL} = [U_{UE} | U_{UE/interf} | U_{Interference} | U_{Noise}] \cdot \Sigma_{DL} \cdot [U_{UE} | U_{UE/interf} | U_{Interference} | U_{Noise}]^H \quad (38)$$

Since the secondary array 96 has a different location in the 3-D space, it is likely that the secondary array 96 eigenvectors to these PIM sources are decorrelated from its second radio node signal subspace. In one or more embodiments, array 94 is associated with the first radio node 16a while the array 96 is associated with the first radio node 16b that is different from the first radio node 16a.

Calibration Stage

The auxiliary transmission from the secondary array 96 to the PIM source may be calibrated. It may be preferable to not have any traffic scheduled on array 94 during this calibration stage/process, although it may not be necessary:

Determine the direction of the PIM source from the secondary array 96:

Perform an initial estimation using one or more arbitrary azimuth and elevation angles. In more complex embodiments, the initial estimation could be based on the knowledge of the geolocation and the elevation coordinates of the two arrays, the 3-D orientation of the arrays 94-96 and the knowledge of the array 94 subspace $U_{UE/interf}$.

Iterate to find the array 96 downlink transmission weights that maximize the received PIM power in the uplink of array 94. The iterations may be based on the optimization of a mathematical cost function or based on an exhaustive search by sweeping both the azimuth and the elevation angles or based on a combination of the two techniques. On each iteration, array 94 may report the received PIM power to array 96 using a backhaul network connection.

Compensate for the different RF propagation conditions from the two antenna arrays 94 and 96 to the PIM source:

A predefined calibration sequence is transmitted from both arrays 94-96 at the same timing reference point such as the start of a radio subframe. The signal that is transmitted by array 94 corresponds to the portion of the calibration sequence that lies in the common UE/interference subspace. This signal is identified by projecting the calibration sequence $\alpha_{cal}$ onto the $U_{UE/interf}$ subspace as follows:

$$\alpha_{UE/interf\_cal} = (U_{UE/interf} U_{UE/interf}^H) \cdot \alpha_{cal} \quad (39)$$

The $\alpha_{UE/interf\_cal}$ vector is forwarded to array 96 together with some transmission scheduling information using a backhaul network connection. This signal is then transmitted by the array 96 with a 180° phase offset.

In some instances, the array 94 transmission may be slightly delayed to match the array 96 propagation time to the PIM source. This delay can be achieved by fine tuning the phase of the frequency domain array 94 downlink weights.

The array 96 transmit power may be adjusted to match the array 94 power at the PIM source.

Iterate to find the optimal timing and power adjustments. The iterations may be based on the optimization of a mathematical cost function or based on an exhaustive search by sweeping the parameters or based on a combination of the two techniques. On each iteration, array 94 may report the received uplink PIM power. This optimization process may require communication between the two arrays 94-96 through a backhaul network connection.

Operational Stage

During operation, the portion of a transmitted signal of the array 94 that lies in the common UE/interference subspace may be identified using a projection onto that subspace as follows:

$$\alpha_{UE/interf} = (U_{UE/interf} U_{UE/interf}^H) \cdot \alpha \quad (40)$$

The $\alpha_{UE/interf}$ vector may be forwarded to array 96 together with transmission scheduling information using a backhaul network connection. This signal is then transmitted by the array 96 with a 180° phase offset, initially using the weights that have been identified during the calibration stage.

Given the unstable nature of radio frequency (RF) propagation environments, some directivity/delay/power adjustments may be needed in the operational stage in order to keep minimizing the total downlink power at the PIM source. These adjustments may be performed iteratively solving either a mathematical cost function, through an exhaustive search by sweeping the parameters or using a combination of the two techniques.

Figure 7:
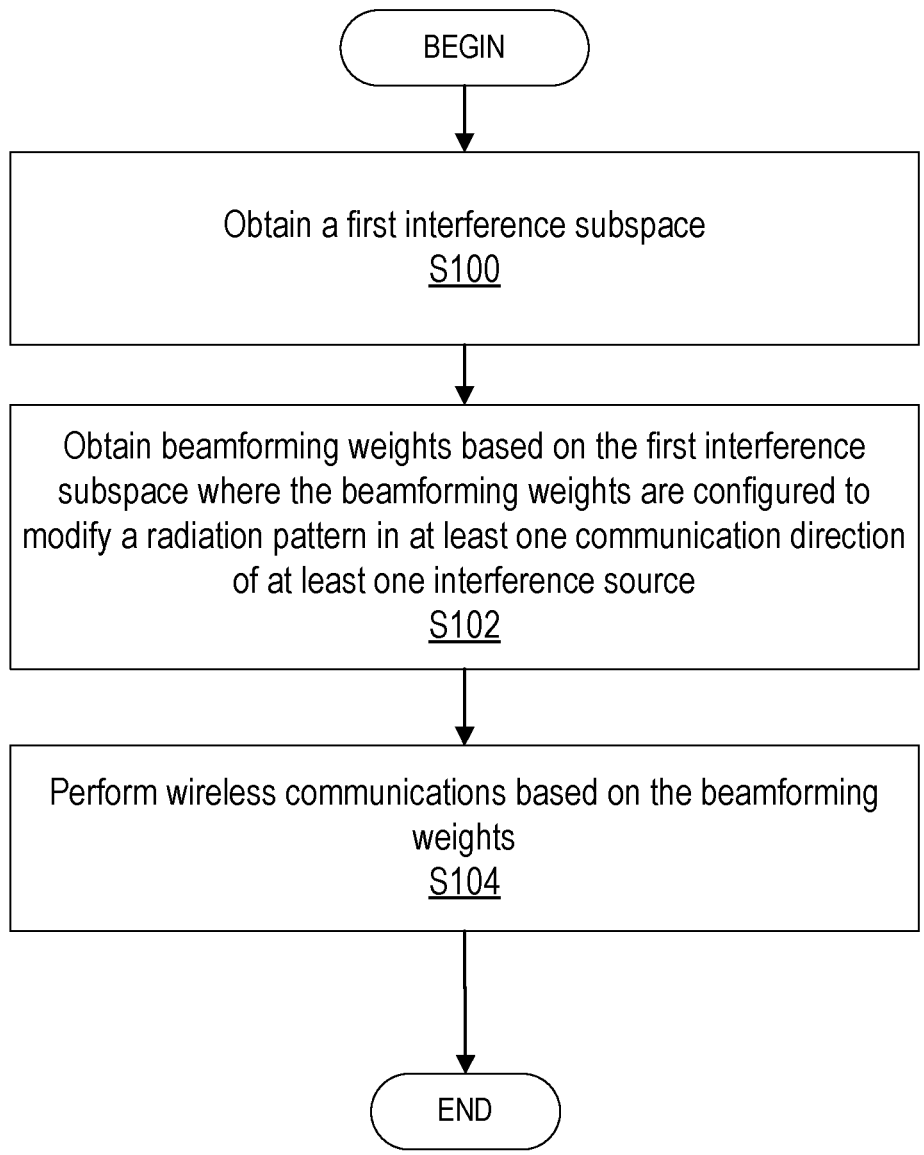
FIG. 7 is a flowchart of an exemplary process in a first radio node for modification of a radiation pattern in at least one communication direction of at least one interference source according to some embodiments of the present disclosure according to some embodiments of the present disclosure.

FIG. 7 is a flowchart of an example process performed by beamforming unit 32 in a first radio node 16 for modifying a radiation pattern in at least one communication direction of at least one interference source, as described herein. The first radio node 16 such as via processing circuitry 68 is configured to obtain a first interference subspace, as described herein (block S100). The first radio node 16, such as via processing circuitry 68, is configured to obtain beamforming weights based on the first interference subspace where the beamforming weights are configured to modify a radiation pattern in at least one communication direction of at least one interference source, as described herein (block S102). The first radio node 16 such as via processing circuitry 68 is configured to perform wireless communications based on the beamforming weights, as described herein (block S104).

According to one or more embodiments, the first interference subspace is an uplink interference subspace where the modified radiation pattern is in a downlink interference subspace. According to one or more embodiments, the processing circuitry is further configured to configure the first radio node to: obtain an estimate of the downlink interference subspace based on the uplink interference subspace where the obtaining of the beamforming weights being based on the estimate of the downlink interference subspace. According to one or more embodiments, the uplink interference subspace corresponds to an uplink set of eigenvectors.

According to one or more embodiments, the modified radiation pattern in at least one communication direction of at least one interference source is configured to reduce the downlink transmission radiation pattern in at least one communication direction of the at least one interference source. According to one or more embodiments, the at least one interference source is at least one passive intermodulation, PIM, source. According to one or more embodiments, the first interference subspace is an uplink subspace where the modified radiation pattern being in an uplink interference subspace. According to one or more embodiments, the estimate of the downlink interference subspace is based on an estimate of a downlink interference covariance matrix.

According to one or more embodiments, the uplink interference subspace corresponds to a plurality of dominant eigenvectors. According to one or more embodiments, the modified radiation pattern in at least one communication direction of at least one interference source is configured to reduce the uplink receive radiation pattern in at least one communication direction of the at least one interference source.

According to one or more embodiments, the uplink interference subspace is determined by: determining a signal subspace corresponding to a plurality of communication directions of a plurality of interference sources including the at least one interference source where the signal subspace corresponding to a first plurality of eigenvectors, generating a second radio node signal subspace based on predetermined second radio nodes 22 where the second radio node signal subspace corresponding to a second plurality of eigenvectors, generating a vector of a plurality of correlation coefficients based on the signal subspace and second radio node signal subspace, and removing eigenvectors from the signal subspace corresponding to the signal correlation coefficients that meet a predefined threshold where the remaining eigenvectors from the signal subspace corresponding to the uplink interference subspace. According to one or more embodiments, the uplink interference subspace is determined by: generating a second radio node uplink signal subspace based on predetermined second radio nodes 22, generating a total uplink signal subspace where the uplink interference subspace being based on the second radio node uplink signal subspace and the total uplink signal subspace, generating a vector of correlation coefficients based on the second radio node uplink signal subspace and the total uplink signal subspace where the uplink interference subspace corresponding to a portion of the total uplink signal subspace associated with correlation coefficients having values below a predefined threshold.

According to one or more embodiments, the uplink interference subspace is obtained by: generating a second radio node uplink signal subspace based on predetermined second radio nodes 22 where a contribution of the predetermined second radio nodes 22 to a total received signal corresponds to a projection of a total received signal onto the second radio node uplink signal subspace, and generating a residual quantity by subtracting the contribution of the predetermined second radio nodes 22 from the total received signal where the residual quantity corresponding to an uplink vector of uplink noise plus interference. The uplink interference subspace is based on the residual quantity.

According to one or more embodiments, the uplink interference subspace is obtained by: generating a residual quantity by subtracting a contribution of predetermined second radio nodes 22 from a total received signal of pilot resource elements where the residual quantity corresponding to an uplink vector of an uplink noise plus interference. The uplink interference subspace is generated based on the residual quantity. According to one or more embodiments, the second radio node signal subspace corresponds to a set of uplink codebooks. According to one or more embodiments, the radiation pattern is modified in the at least one communication direction of at least one interference source by removing a signal contribution that lies in an estimated downlink interference subspace by performing a projection.

According to one or more embodiments, the first interference subspace is used to modify the radiation pattern in the at least one communication direction of at least one interference source in more than one radio communication channel located in the same or in different radio frequency communication bands. According to one or more embodiments, the wireless communications based on the beamforming weights are configured to be of similar power and 180 degrees out of phase with other wireless communications at the at least one interference source.

Figure 8:
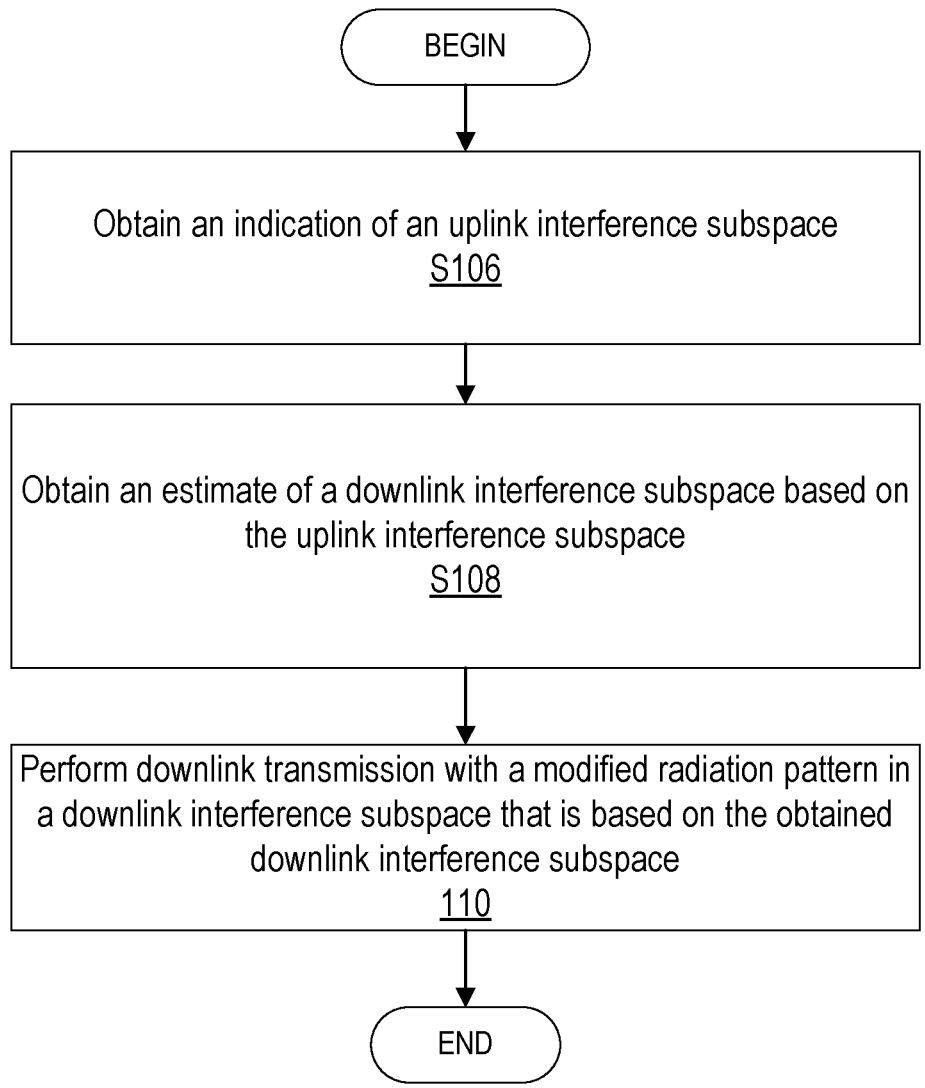
FIG. 8 is a flowchart of another exemplary process in a first radio node for modification of a radiation pattern in at least one communication direction of at least one interference source according to some embodiments of the present disclosure.

FIG. 8 is a flowchart of another example process of beamforming unit 32 in a first radio node 16 for modifying a radiation pattern in at least one communication direction of at least one interference source, as described herein. In particular, this example is directed to toward downlink transmissions. The first radio node 16 such as via processing circuitry 68 is configured to obtain an indication of an uplink interference subspace, as described herein (block S106). The first radio node 16 such as via processing circuitry 68 is configured to obtain an estimate of a downlink interference subspace based on the uplink interference subspace, as described herein (block S108). The first radio node 16 such as via processing circuitry 68 is configured to perform downlink transmission with a modified radiation pattern in a downlink interference subspace that is based on the estimated downlink interference subspace, as described herein (block S110).

In one or more embodiments, the modified radiation pattern corresponds to a reduction in wireless communication signal power in at least one communication direction of at least one passive intermodulation, PIM, source. In one or more embodiments, the estimate of the downlink interference subspace is based on an estimate of a downlink interference covariance matrix. In one or more embodiments, the estimate of the downlink interference subspace corresponds to a set of eigenvectors of the estimated downlink interference covariance matrix where a remaining set of eigenvectors of the estimated downlink interference covariance matrix corresponding to a noise subspace.

In one or more embodiments, the modified radiation pattern that reduces wireless communication signal power in at least one communication direction of at least one PIM source is configured to reduce the downlink transmission radiation pattern in at least one communication direction of the at least one PIM source. In one or more embodiments, the uplink interference subspace is obtained by: determining a signal subspace corresponding to a plurality of communication directions of a plurality of interference sources including the at least one PIM source, the signal subspace corresponding to a first plurality of eigenvectors, generating a second radio node signal subspace based on predetermined second radio nodes 22 where the second radio node signal subspace corresponding to a second plurality of eigenvectors, generating a vector of a plurality of correlation coefficients based on the signal subspace and second radio node signal subspace and removing eigenvectors from the signal subspace corresponding to the signal correlation coefficients that meet a predefined threshold. The remaining eigenvectors from the signal subspace correspond to the uplink interference subspace.

In one or more embodiments, the uplink interference subspace is obtain by: generating a second radio node uplink signal subspace based on predetermined second radio nodes 22 and generating a total uplink signal subspace where the uplink interference subspace is based on the second radio node uplink signal subspace and the total uplink signal subspace, and generating a vector of correlation coefficients based on the second radio node uplink signal subspace and the total uplink signal subspace. The uplink interference subspace corresponds to a portion of the total uplink signal subspace associated with correlation coefficients having values below a predefined threshold.

In one or more embodiments, the uplink interference subspace is obtained by: generating a second radio node uplink signal subspace based on predetermined second radio nodes 22 where a contribution of the predetermined second radio nodes 22 to a total received signal corresponds to a projection of a total received signal onto the second radio node uplink signal subspace, and generating a residual quantity by subtracting the contribution of the predetermined second radio nodes 22 from the total received signal where the residual quantity corresponding to an uplink vector of uplink noise plus interference. The uplink interference subspace being based on the residual quantity.

In one or more embodiments, the uplink interference subspace is obtained by: generating a residual quantity by subtracting a contribution of predetermined second radio nodes 22 from a total received signal of pilot resource elements, the residual quantity corresponding to an uplink vector of an uplink noise plus interference. The uplink interference subspace is generated based on the residual quantity. In one or more embodiments, the second radio node signal subspace corresponds to a set of uplink codebooks. In one or more embodiments, the radiation pattern is modified in the at least one communication direction of at least one interference source by removing a signal contribution that lies in an estimated downlink interference subspace by performing a projection.

In one or more embodiments, the first interference subspace is used to modify the radiation pattern in the at least one communication direction of at least one interference source in more than one radio communication channel located in the same or in different radio frequency communication bands. In one or more embodiments, the wireless communications based on the beamforming weights are configured to be of similar power and 180 degrees out of phase with other wireless communications at the at least one interference source.

Figure 9:
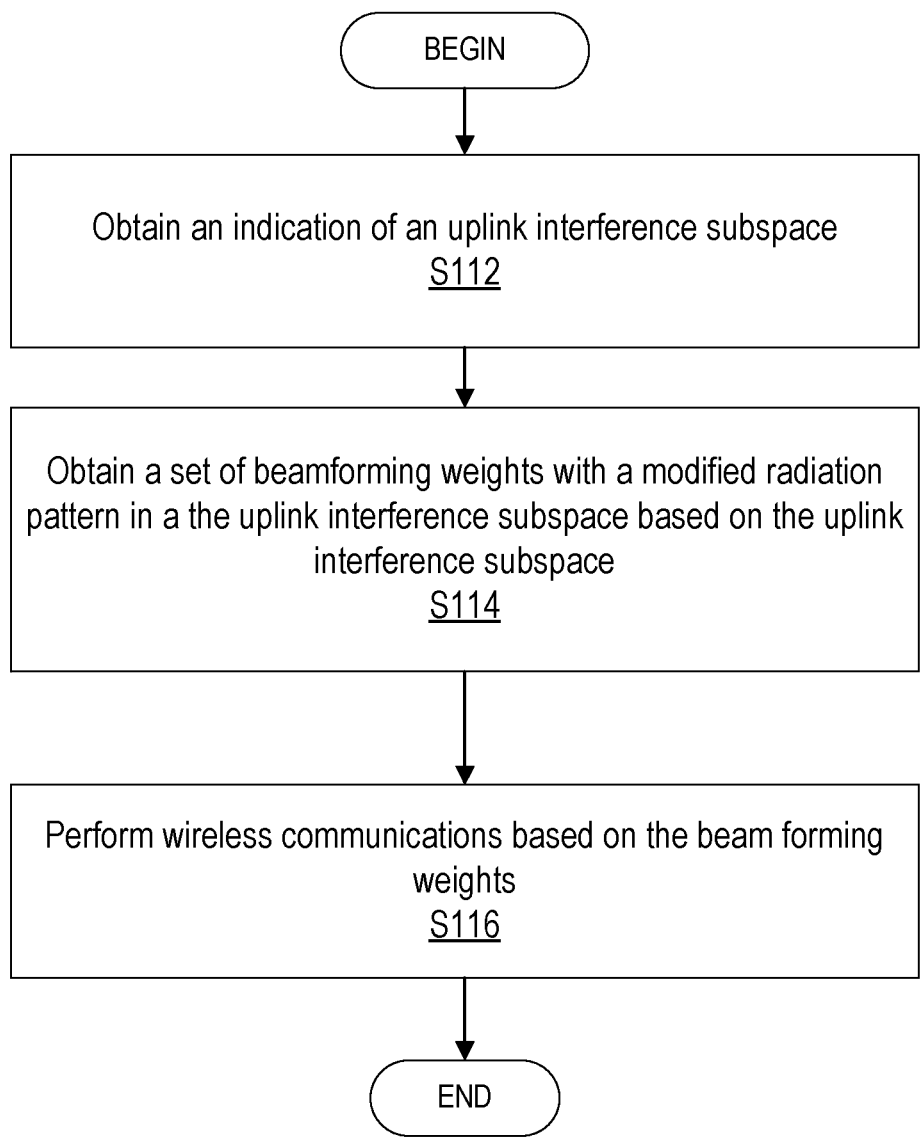
FIG. 9 is a flowchart of yet another exemplary process in a first radio node for modification of a radiation pattern in at least one communication direction of at least one interference source according to some embodiments of the present disclosure.

FIG. 9 is a flowchart of another example process of beamforming unit 32 in a first radio node 16 for modifying a radiation pattern in at least one communication direction of at least one interference source, as described herein. In particular, this example is directed to uplink transmissions. The first radio node 16 such as via processing circuitry 68 is configured to obtain an indication of an uplink interference subspace (block S112). The first radio node 16 such as via processing circuitry 68 is configured to obtain a set of beamforming weights with a modified radiation pattern in the uplink interference subspace based on the uplink interference subspace (block S114). In one or more embodiments, the reduced radiation pattern corresponds to a reduction in wireless communication signal power in at least one communication direction of at least one passive intermodulation, PIM, source. The first radio node 16 such as via processing circuitry 68 is configured to perform wireless communications based on the beam forming weights (block S116).

In one or more embodiments, the modified radiation pattern that reduces wireless communication signal power in at least one communication direction of at least one PIM source is configured to reduce the uplink receive radiation pattern in at least one communication direction of the at least one PIM source. In one or more embodiments, the uplink interference subspace is obtained by: determining a signal subspace corresponding to a plurality of communication directions of a plurality of interference sources including the at least one PIM source where the signal subspace corresponds to a first plurality of eigenvectors, generating a second radio node signal subspace based on predetermined second radio nodes 22 where the second radio node signal subspace corresponding to a second plurality of eigenvectors, generating a vector of a plurality of correlation coefficients based on the signal subspace and second radio node signal subspace and removing eigenvectors from the signal subspace corresponding to the signal correlation coefficients that meet a predefined threshold. The remaining eigenvectors from the signal subspace correspond to the uplink interference subspace.

In one or more embodiments, the uplink interference subspace is obtained by: generating a second radio node uplink signal subspace based on predetermined second radio nodes 22, generating a total uplink signal subspace where the uplink interference subspace is based on the second radio node uplink signal subspace and the total uplink signal subspace, and generating a vector of correlation coefficients based on the second radio node uplink signal subspace and the total uplink signal subspace. The uplink interference subspace corresponds to a portion of the total uplink signal subspace associated with correlation coefficients having values below a predefined threshold.

In one or more embodiments, the uplink interference subspace is obtained by: generating a second radio node uplink signal subspace based on predetermined second radio nodes 22 where a contribution of the predetermined second radio nodes 22 to a total received signal corresponds to a projection of a total received signal onto the second radio node uplink signal subspace, and generating a residual quantity by subtracting the contribution of the predetermined second radio nodes 22 from the total received signal where the residual quantity corresponding to an uplink vector of uplink noise plus interference. The uplink interference subspace being based on the residual quantity.

In one or more embodiments, the uplink interference subspace is obtained by: generating a residual quantity by subtracting a contribution of predetermined second radio nodes 22 from a total received signal of pilot resource elements, the residual quantity corresponding to an uplink vector of an uplink noise plus interference. The uplink interference subspace is generated based on the residual quantity. In one or more embodiments, the second radio node signal subspace corresponds to a set of uplink codebooks. In one or more embodiments, the radiation pattern is modified in the at least one communication direction of at least one interference source by removing a signal contribution that lies in an estimated downlink interference subspace by performing a projection.

In one or more embodiments, the first interference subspace is used to modify the radiation pattern in the at least one communication direction of at least one interference source in more than one radio communication channel located in the same or in different radio frequency communication bands. In one or more embodiments, the wireless communications based on the beamforming weights are configured to be of similar power and 180 degrees out of phase with other wireless communications at the at least one interference source.

According to one or more embodiments, described herein, one or more interference sources may correspond to one or more inter-cell second radio nodes 22 that are interferers in the uplink and interfered in the downlink.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first radio node comprising processing circuitry configured to configure the first radio node to:
   obtain a first interference subspace;
   obtain beamforming weights based on the first interference subspace, the beamforming weights configured to modify a radiation pattern in at least one communication direction of at least one interference source, wherein the at least one interference source is at least one passive intermodulation, PIM, source; and
   perform wireless communications based on the beamforming weights.

2. The first radio node of claim 1, wherein the first interference subspace is an uplink interference subspace; and
   the modified radiation pattern being in a downlink interference subspace.

3. The first radio node of claim 2, wherein the processing circuitry is further configured to configure the first radio node to:
   obtain an estimate of the downlink interference subspace based on the uplink interference subspace, wherein the uplink interference subspace corresponds to an uplink set of eigenvectors; and
   the obtaining of the beamforming weights being based on the estimate of the downlink interference subspace.

4. The first radio node of claim 2, wherein the modified radiation pattern in at least one communication direction of at least one interference source is configured to reduce the downlink transmission radiation pattern in at least one communication direction of the at least one interference source.

5. The first radio node of claim 2, wherein the uplink interference subspace is determined by:
   determining a signal subspace corresponding to a plurality of communication directions of a plurality of interference sources including the at least one interference source, the signal subspace corresponding to a first plurality of eigenvectors;
   generating a second radio node signal subspace based on predetermined second radio nodes, the second radio node signal subspace corresponding to a second plurality of eigenvectors;
   generating a vector of a plurality of correlation coefficients based on the signal subspace and second radio node signal subspace;
   removing eigenvectors from the signal subspace corresponding to the signal correlation coefficients that meet a predefined threshold; and
   the remaining eigenvectors from the signal subspace corresponding to the uplink interference subspace.

6. The first radio node of claim 5, wherein the second radio node signal subspace corresponds to a set of uplink codebooks.

7. The first radio node of claim 2, wherein the uplink interference subspace is determined by:
   generating a second radio node uplink signal subspace based on predetermined second radio nodes;
   generating a total uplink signal subspace;
   the uplink interference subspace being based on the second radio node uplink signal subspace and the total uplink signal subspace;
   generating a vector of correlation coefficients based on the second radio node uplink signal subspace and the total uplink signal subspace; and the uplink interference subspace corresponding to a portion of the total uplink signal subspace associated with correlation coefficients having values below a predefined threshold.

8. The first radio node of claim 2, wherein the uplink interference subspace is obtained by:
generating a second radio node uplink signal subspace based on predetermined second radio nodes, a contribution of the predetermined second radio nodes to a total received signal corresponds to a projection of a total received signal onto the second radio node uplink signal subspace;
generating a residual quantity by subtracting the contribution of the predetermined second radio nodes from the total received signal, the residual quantity corresponding to an uplink vector of uplink noise plus interference; and
the uplink interference subspace being based on the residual quantity.

9. The first radio node of claim 2, wherein the uplink interference subspace is obtained by:
generating a residual quantity by subtracting a contribution of predetermined second radio nodes from a total received signal of pilot resource elements, the residual quantity corresponding to an uplink vector of an uplink noise plus interference; and
the uplink interference subspace being generated based on the residual quantity.

10. The first radio node of claim 1, wherein the first interference subspace is an uplink subspace, wherein the uplink interference subspace corresponds to a plurality of dominant eigenvectors; and
the modified radiation pattern being in an uplink interference subspace.

11. The first radio node of claim 1, wherein the modified radiation pattern in at least one communication direction of at least one interference source is configured to reduce the uplink receive radiation pattern in at least one communication direction of the at least one interference source.

12. The first radio node of claim 1, wherein the radiation pattern is modified in the at least one communication direction of at least one interference source by removing a signal contribution that lies in an estimated downlink interference subspace by performing a projection.

13. The first radio node of claim 1, wherein the first interference subspace is used to modify the radiation pattern in the at least one communication direction of at least one interference source in more than one radio communication channel located in the same or in different radio frequency communication bands.

14. The first radio node of claim 1, wherein the wireless communications based on the beamforming weights are configured to be of similar power and 180 degrees out of phase with other wireless communications at the at least one interference source.

15. A method for a first radio node, the method comprising:
obtaining a first interference subspace;
obtaining beamforming weights based on the first interference subspace, the beamforming weights configured to modify a radiation pattern in at least one communication direction of at least one interference source, wherein the at least one interference source is at least one passive intermodulation, PIM, source; and
performing wireless communications based on the beamforming weights.

16. The method of claim 15, wherein the first interference subspace is an uplink interference subspace; and
the modified radiation pattern being in a downlink interference subspace, wherein the modified radiation pattern in at least one communication direction of at least one interference source is configured to reduce the downlink transmission radiation pattern in at least one communication direction of the at least one interference source, the method further comprising:
obtaining an estimate of the downlink interference subspace based on the uplink interference subspace, wherein the uplink interference subspace corresponds to an uplink set of eigenvectors; and
the obtaining of the beamforming weights being based on the estimate of the downlink interference subspace.

17. The method of claim 16, wherein the uplink interference subspace is determined by:
generating a second radio node uplink signal subspace based on predetermined second radio nodes;
generating a total uplink signal subspace;
the uplink interference subspace being based on the second radio node uplink signal subspace and the total uplink signal subspace;
generating a vector of correlation coefficients based on the second radio node uplink signal subspace and the total uplink signal subspace; and
the uplink interference subspace corresponding to a portion of the total uplink signal subspace associated with correlation coefficients having values below a predefined threshold.

18. The method of claim 16, wherein the uplink interference subspace is obtained by:
generating a second radio node uplink signal subspace based on predetermined second radio nodes, a contribution of the predetermined second radio nodes to a total received signal corresponds to a projection of a total received signal onto the second radio node uplink signal subspace;
generating a residual quantity by subtracting the contribution of the predetermined second radio nodes from the total received signal, the residual quantity corresponding to an uplink vector of uplink noise plus interference; and
the uplink interference subspace being based on the residual quantity.

19. The method of claim 16, wherein the uplink interference subspace is obtained by:
generating a residual quantity by subtracting a contribution of predetermined second radio nodes from a total received signal of pilot resource elements, the residual quantity corresponding to an uplink vector of an uplink noise plus interference; and
the uplink interference subspace being generated based on the residual quantity.

* * * * *